United States Patent
Park et al.

(10) Patent No.: US 8,780,487 B2
(45) Date of Patent: Jul. 15, 2014

(54) METHOD OF TUNING SKEW BETWEEN READ HEAD AND WRITE HEAD AND STORAGE DEVICE THEREOF

(75) Inventors: Jun Bum Park, Pohang-si (KR); Moon Choi Park, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 21 days.

(21) Appl. No.: 13/539,253

(22) Filed: Jun. 29, 2012

(65) Prior Publication Data

US 2013/0027800 A1 Jan. 31, 2013

(30) Foreign Application Priority Data

Jun. 30, 2011 (KR) .................. 10-2011-0064965

(51) Int. Cl.
*G11B 5/596* (2006.01)
*G11B 27/36* (2006.01)
*G11B 20/20* (2006.01)
*G11B 5/09* (2006.01)

(52) U.S. Cl.
USPC ............... 360/77.06; 360/31; 360/76; 360/53

(58) Field of Classification Search
None
See application file for complete search history.

(56) References Cited

U.S. PATENT DOCUMENTS

| 7,719,789 B2 * | 5/2010 | Aoyama | .................. 360/77.08 |
| 2003/0026017 A1 * | 2/2003 | Chong et al. | .................. 360/31 |

* cited by examiner

*Primary Examiner* — Andrew L Sniezek
(74) *Attorney, Agent, or Firm* — Cesari & Reed, LLP; Kirk A. Cesari; Christian W. Best

(57) ABSTRACT

Tuning a skew between a read head and a write head, may include setting a center value of a track according to a track density of a storage medium; writing data having a certain pattern to at least one target track and at least two tracks adjacent to the target track, while following the center value of the track; reading the data having a certain pattern from the target track by using a plurality of off track values in an off track range based on the center value of the track; and detecting an off track value having a minimum error occurrence number among error occurrence numbers with respect to the read data having a certain pattern corresponding to each of the plurality of off tracks, as an optimum off track value of the target track.

20 Claims, 12 Drawing Sheets

METHOD OF TUNING SKEW BETWEEN READ HEAD AND WRITE HEAD AND STORAGE DEVICE THEREOF

CROSS-REFERENCE TO RELATED APPLICATION

This application claims priority under 35 U.S.C. §119(a) of Korean Patent Application No. 10-2011-0064965, filed on Jun. 30, 2011, the entire disclosure of which is hereby incorporated by reference.

BACKGROUND

The present disclosure relates to a storage device having a read head and a write head, and more particularly, to a method of turning a skew between a read head and a write head and a storage device performing the same.

A storage device that can be connected to a host device can write data to a storage medium through a write head according to a command transmitted from a host device or read data from the storage medium through a read head.

As storage mediums tend to be increased in capacity and density, a track density of storage mediums is gradually increasing.

SUMMARY

An embodiment disclosed herein provides a method of tuning a skew between a read head and a write head adaptive for a track density of a storage medium, and a storage device performing the same.

According to an embodiment disclosed herein, there is provided a method of tuning a skew between a read head and a write head, including: setting a center value of a track according to a track density of a storage medium; writing data having a certain pattern to at least one target track and at least two tracks adjacent to the target track, while following the center value of the track; reading the data having a certain pattern from the target track by using a plurality of off track values in an off track range based on the center value of the track; and detecting an off track value having a minimum error occurrence number among error occurrence numbers with respect to the read data having a certain pattern corresponding to each of the plurality of off tracks, as an optimum off track value of the target track.

According to another embodiment disclosed herein, there is provided a storage device including: a storage medium storing data; and a processor detecting an optimum off track value of at least one target track by setting a center value of a track according to a track density of the storage medium, wherein the processor may write data having a certain pattern to at least one target track and at least two tracks adjacent to the target track, while following a center value of the track, read the data having a certain pattern from the target track by using a plurality of off track value in an off track range based on the center value of the track, and detect an off track value having a minimum error occurrence number among error occurrence numbers with respect to the read data having a certain pattern corresponding to each of the plurality of off tracks, as an optimum off track value of the target track.

According to another embodiment disclosed herein, there is provided a method of tuning a skew between the read head and the write head in a computer-readable storage medium storing a program for performing a method of tuning a skew between a read head and a write head is performed together with the foregoing method of tuning a skew between a read head and a write head According to another embodiment, a center value of a track may be set according to a track density of a storage medium and a skew tuning is performed between a read head and a write head in an off track range based on a center value of a pre-set track, whereby a value (or a skew value) of an optimum off track can be more rapidly and accurately.

The foregoing and other objects, features, aspects and advantages of the embodiments disclosed herein will become more apparent from the following detailed description when taken in conjunction with the accompanying drawings.

DETAILED DESCRIPTION

Figure 1:
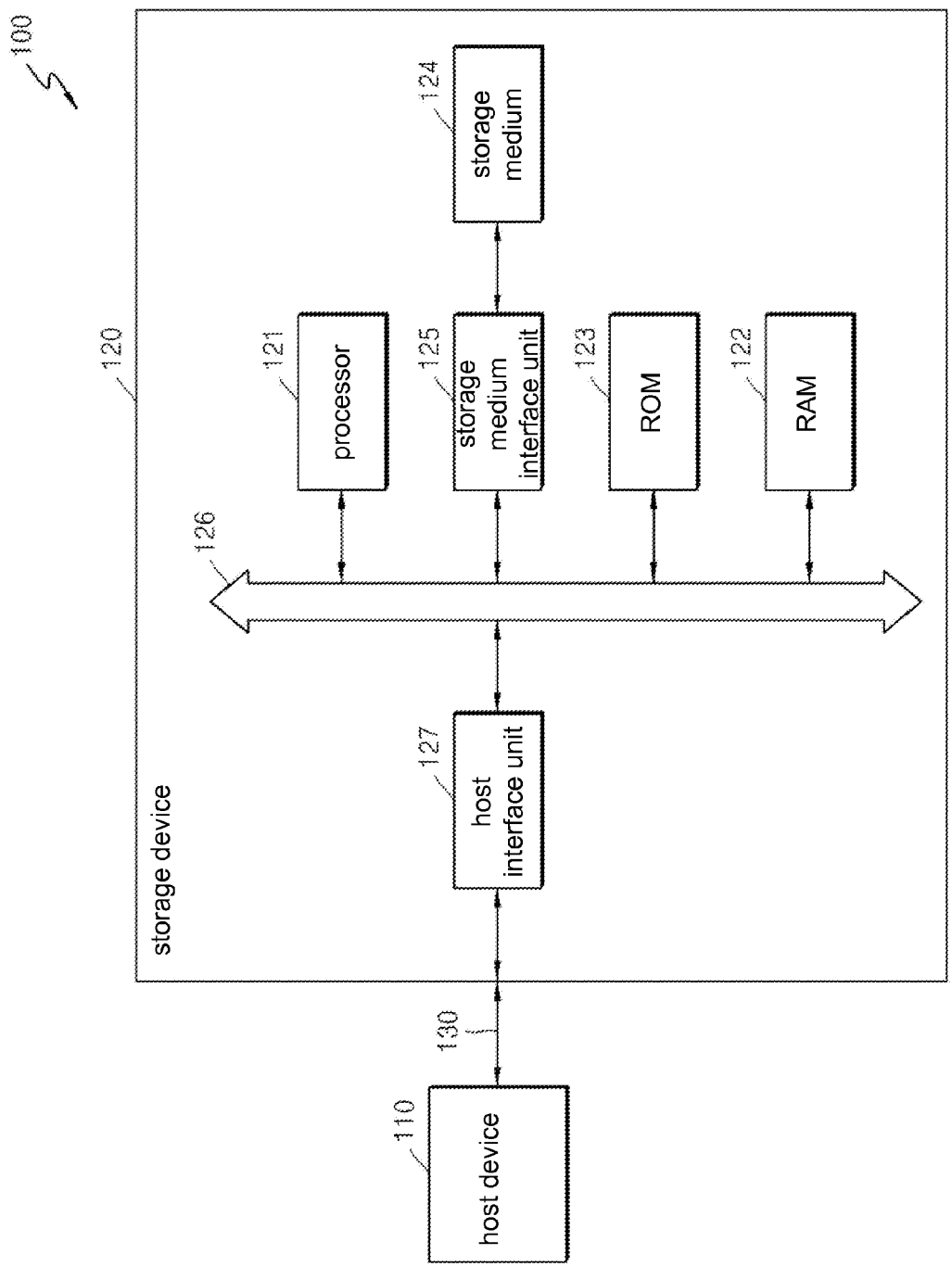
FIG. 1 is a functional block diagram of a host device-storage device-based system according to an embodiment.

The foregoing and other objects, features, aspects and advantages of the present disclosure will become more apparent from the following detailed description when taken in conjunction with the accompanying drawings.

Hereinafter, embodiments will be described in detail by describing preferred embodiments of the present disclosure. The like reference numerals shown in each drawing denote the same elements.

Presented herein, tuning a skew between a read head and a write head, may include setting a center value of a track according to a track density of a storage medium; writing data having a certain pattern to at least one target track and at least two tracks adjacent to the target track, while following the center value of the track; reading the data having a certain pattern from the target track by using a plurality of off track values in an off track range based on the center value of the track; and detecting an off track value having a minimum error occurrence number among error occurrence numbers with respect to the read data having a certain pattern corresponding to each of the plurality of off tracks, as an optimum off track value of the target track.

Further, an embodiment disclosed herein provides a method of tuning a skew between a read head and a write head adaptive for a track density of a storage medium, and a storage device performing the same.

According to an embodiment disclosed herein, there is provided a method of tuning a skew between a read head and a write head, including: setting a center value of a track according to a track density of a storage medium; writing data having a certain pattern to at least one target track and at least two tracks adjacent to the target track, while following the center value of the track; reading the data having a certain pattern from the target track by using a plurality of off track values in an off track range based on the center value of the track; and detecting an off track value having a minimum error occurrence number among error occurrence numbers with respect to the read data having a certain pattern corresponding to each of the plurality of off tracks, as an optimum off track value of the target track.

When the target track is Nth track, the at least two adjacent tracks may include (N−1)th track and (N+1)th track, and N is an integer of 2 or greater.

The method of tuning a skew between a read head and a write head may further include: performing DC-erasing before writing the data having a certain pattern in the least two tracks adjacent to the target track.

In the setting of the center value of the track, a position changed in a negative (−) direction from a reference center value of the track may be set as the center value of the track according to the density of the track.

The track density may be based on the number of tracks per inch, and the data having a certain pattern may use a burst signal.

According to another embodiment disclosed herein, there is provided a storage device including: a storage medium storing data; and a processor detecting an optimum off track value of at least one target track by setting a center value of a track according to a track density of the storage medium, wherein the processor may write data having a certain pattern to at least one target track and at least two tracks adjacent to the target track, while following a center value of the track, read the data having a certain pattern from the target track by using a plurality of off track value in an off track range based on the center value of the track, and detect an off track value having a minimum error occurrence number among error occurrence numbers with respect to the read data having a certain pattern corresponding to each of the plurality of off tracks, as an optimum off track value of the target track.

According to another embodiment disclosed herein, there is provided a method of tuning a skew between the read head and the write head in a computer-readable storage medium storing a program for performing a method of tuning a skew between a read head and a write head is performed together with the foregoing method of tuning a skew between a read head and a write head According to another embodiment, a center value of a track may be set according to a track density of a storage medium and a skew tuning is performed between a read head and a write head in an off track range based on a center value of a pre-set track, whereby a value (or a skew value) of an optimum off track can be more rapidly and accurately.

For example, when a value (x) of a TPI (Track Per Inch) of a storage medium is TPI 0%≤x<TPI 25%, the center value of the track is 0%, and the range of the off track is −25%~+25, if the value (x) of the TPI (Track Per Inch) of the storage medium is TPI 25%≤x<TPI 50%, the center value of the track is changed from 0% to −10% and the range of the off track is changed to −35%~+15% to perform skew tuning between the read head and the write head to thus obtain an optimum off track value more quickly and accurately. When the center value of the track is changed from 0% to ~10%, the range of the off track may be set to be narrower than the foregoing −35%~+15%. This is because the value of the TPI has been further increased.

When the embodiments disclosed herein are applied to a storage medium having a very high TPI like a storage medium in which data is written according to a shingled write scheme, an optimum off track value can be more quickly and accurately obtained, thus preventing occurrence of read missing.

FIG. 1 is a functional block diagram of a host device-storage device-based system according to an embodiment. A host device-storage device-based system 100 may be mentioned as a computer system, but the present embodiments are not limited thereto.

With reference to FIG. 1, the host device-storage device-based system 100 includes a host device 110, a storage device 120, and a communication link 130.

The host device 110 may generate a command for operating the storage device 120 and transmit it to the accessed storage device 120 through the communication link 130, and perform an operation or process of transmitting data to the storage device 120 or receiving data from the storage device 120 according to the generated command.

The host device 110 may be a device, a server, a digital camera, a digital media player, a set-top box, a processor, a field programmable gate array, a programmable logic device, and/or a certain suitable electronic device operated according to a Microsoft Windows Operating System program. The host device 110 may be integrated with the storage device 120. The communication link 130 may be configured to connect the host device 110 and the storage device 120 by a wire communication link or a wireless communication link.

When the host device 110 and the storage device 120 are connected by a wire communication link, the communication link 130 may be configured as a connector electrically connecting an interface port of the host device 110 and an interface port of the storage device 120. The connector may include a data connector and a power connector. For example, when a SATA (Serial Advanced Technology Attachment) is used between the host device 110 and the storage device 120, the connector may be configured as a 7-pin SATA data connector and 15-pin SATA power connector.

When the host device 110 and the storage device are connected by a wireless communication link, the communication link 130 may be configured based on wireless communication such as Bluetooth or ZigBee.

The storage device 120 may write data received from the host device 110 to the storage medium 124 according to a command received from the host device 110 or transmit data read from the storage medium 124 to the host device 110. The storage device 120 may be mentioned as a data storage device, a disk drive, a disk system, or a memory device. When data is written to the storage medium 124 based on a shingled write operation as described hereinafter, the storage device 120 may be mentioned as a shingled write disk system or a shingled magnetic recording system.

With reference to FIG. 1, the storage device 120 may include a processor 121, a RAM (random access memory) 122, a ROM (read only memory) 123, a storage medium 124, a storage medium interface unit 125, a bus 126, and a host interface unit 127, but is not limited thereto. Namely, the storage device 120 may includes greater components than those illustrated in FIG. 1 or may include fewer components than those illustrated in FIG. 1. For example, the processor 121, the RAM 122, and the host interface unit 127 may be configured as a single controller.

The processor 121 may interpret a command received from the host device 110 through the host interface unit 127 and the bus 126, and control the components of the storage device 120 according to interpretation results. The processor 121 may include a code object management unit. The processor 121 may load a code object stored in the storage medium 124 to the RAM 122. For example, the processor 121 may load code objects for execute a method of tuning a skew between a read head and a write head according to the flow chart of FIG. 8 or FIG. 10 as described hereinafter stored in the storage medium 124, to the RAM 122.

Figure 8:
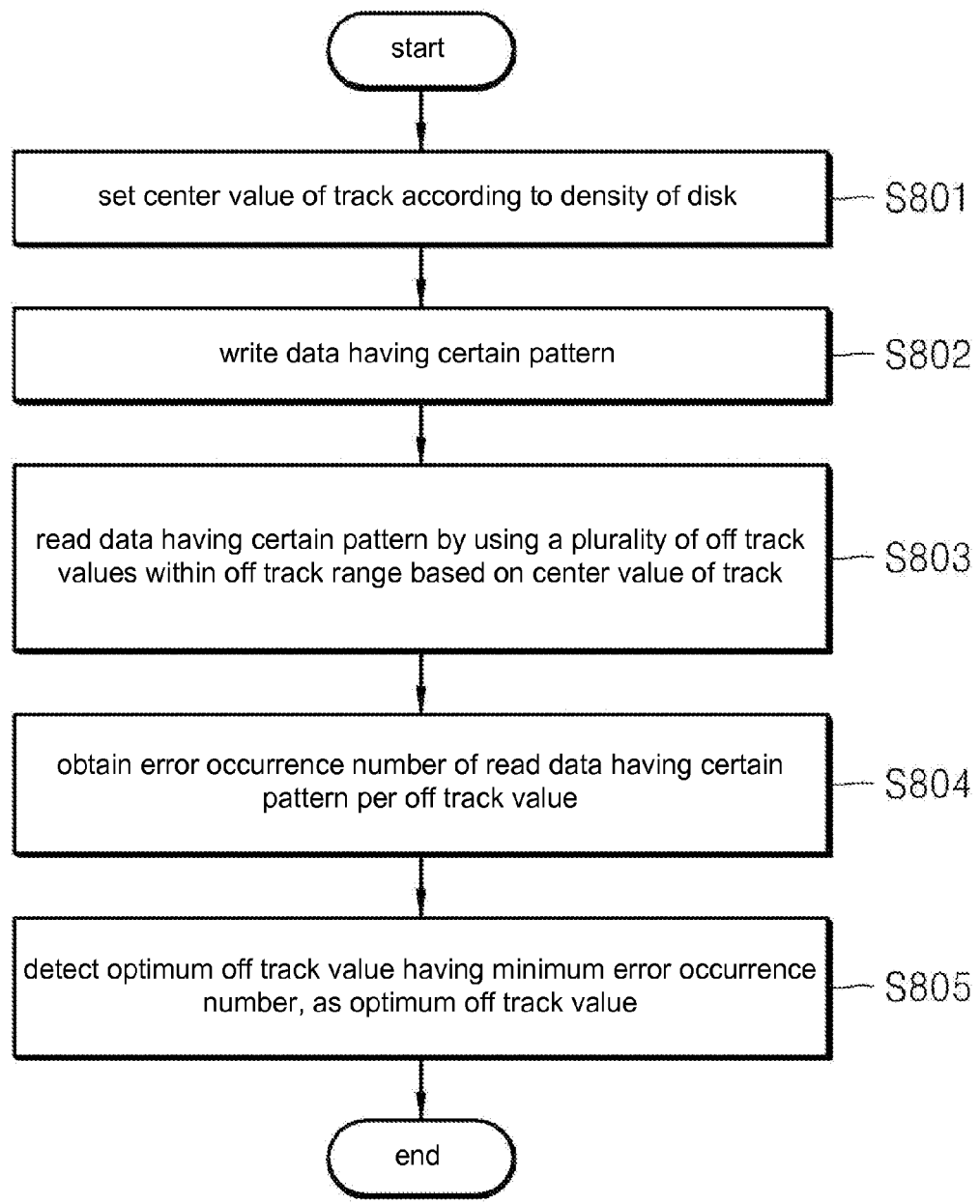
FIG. 8 is a flow chart illustrating a method of tuning a skew between a read head and a write head according to another embodiment.
Figure 10:
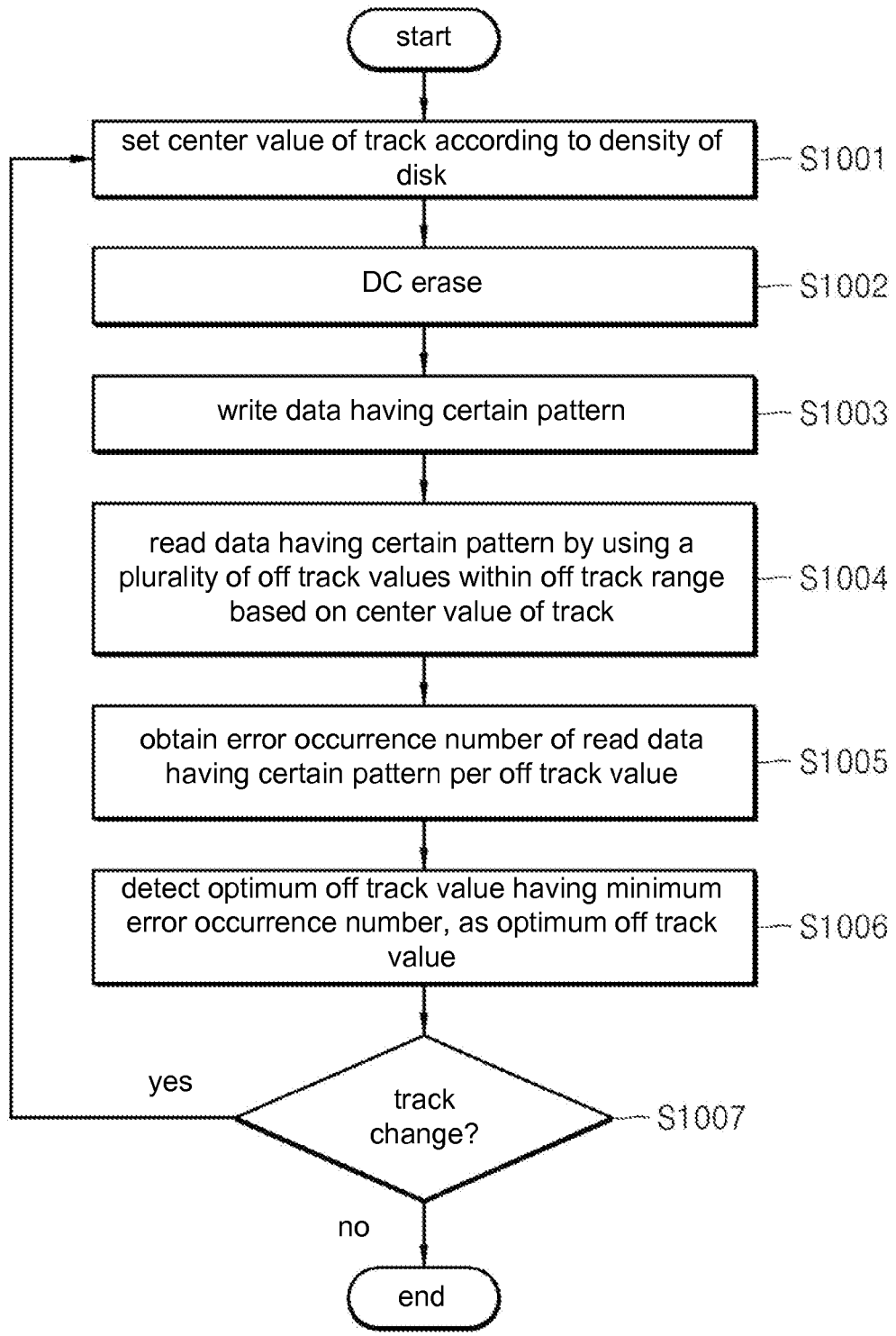
FIG. 10 is a flow chart illustrating a method of tuning a skew between a read head and a write head according to another embodiment.

The processor 121 may execute a task with respect to the method of tuning a skew between a read head and a write head of FIG. 8 or FIG. 10 by using code objects loaded to the RAM 122. The method of tuning a skew between a read head and a write head executed by the processor 121 may be described in detail with reference to FIGS. 8 and 10.

Program codes and data required for operating the storage device 120 may be stored in the ROM 123. The program codes and data stored in the ROM 123 may be loaded to the RAM 122 under the control of the processor 121. Data that are stored in the ROM and that may be loaded to the RAM may include, for example, zone map layout information including information regarding a TPI (Track Per Inch) of each zone of the storage medium 124 and center information of a track that may be set according to TPI. The center information of a track may be mentioned as center information of read off track.

Figure 2:
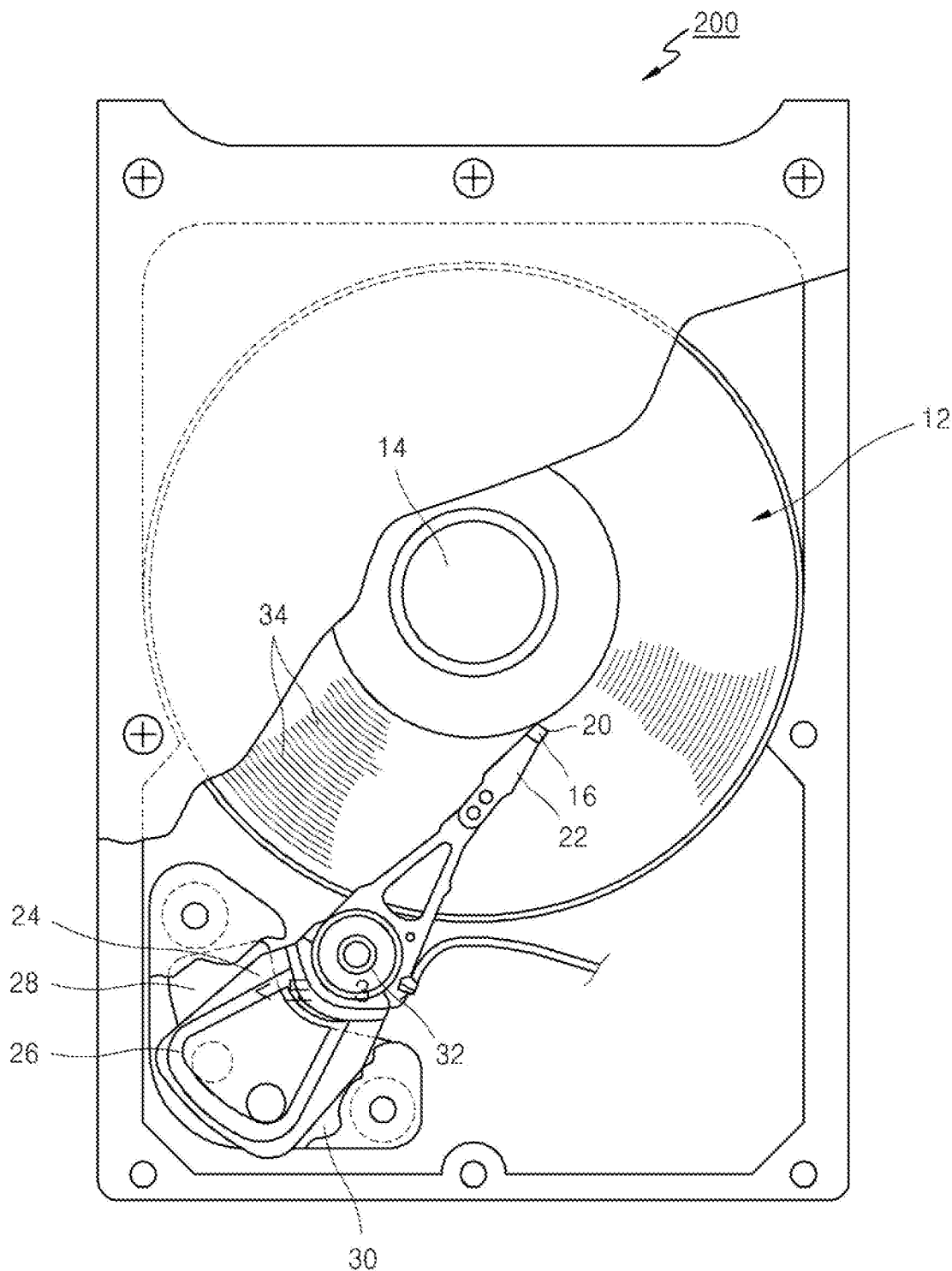
FIG. 2 is a plan view of a head disk assembly when a storage device illustrated in FIG. 1 is a disk drive.

FIG. 2 is a plan view of a head disk assembly when a storage device illustrated in FIG. 1 is a disk drive. With reference to FIG. 2, a head disk assembly 200 includes at least one disk 12 rotated by a spindle motor 14. The disk 12 should be interpreted that it corresponds to the storage medium 124 of FIG. 1. The head disk assembly 200 includes a head 16 positioned to be adjacent to a surface of the disk 12.

The head 16 may detect and magnetizes each disk 12 to read data from the rotated disk 12, and write data to the disk 12. In general, the head 16 is coupled to a surface of the disk 12. In FIG. 2, a single head 16 is illustrated but it should be interpreted to include a write head for magnetizing the disk 12 and a read head for detecting a magnetic field. The read head may be configured as a magneto-resistive element. The read head may be mentioned as a read element, and the write head may be mentioned as a write element. The head 16 may be mentioned as a magnetic head or a transducer.

Figure 3A:
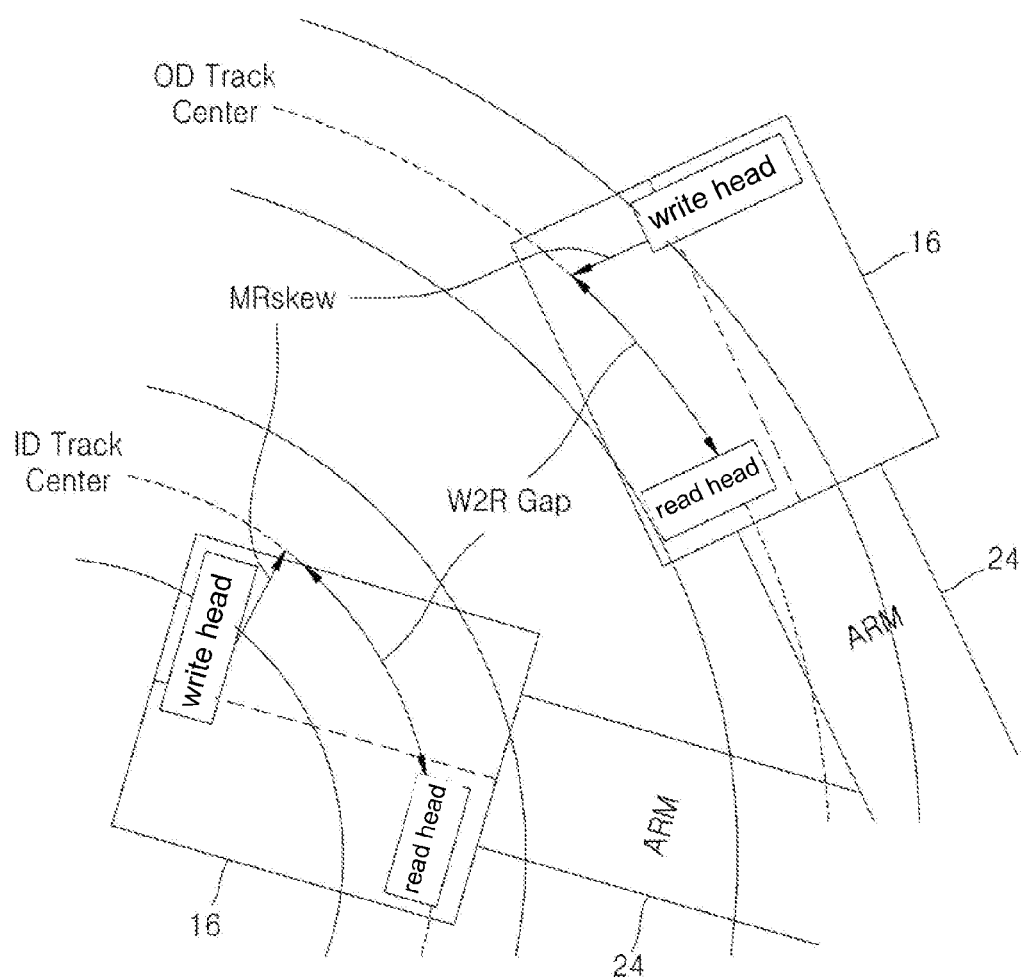
FIGS. 3A and 3B are views showing a relationship between a read head and a write head included in a head.

FIG. 3A is an example of illustrating a relationship between a read head and a write head, in which a center of a read head and a center of the write head are different. Thus, with reference to FIG. 3A, it can be seen that when the read head is positioned at the center of the track, the write head is not positioned at the center of the track. When the read head is positioned at the center of the track, a distance from the write head to the center of the track is a skew, a magnetic resistive skew, a skew value, or a physical offset. Based on the center of the track, the distance between the read head and the write head may be a W2R gap (Write-to-Read gap). An MR skew in an outer diameter (OD) track and an inner diameter (ID) track of the disk 12 may have a difference as shown in FIG. 3A. This is because the head 16 moves in an arc shape in a radial direction of the disk 12 according to an operation of an actuator arm 24.

Figure 3B:
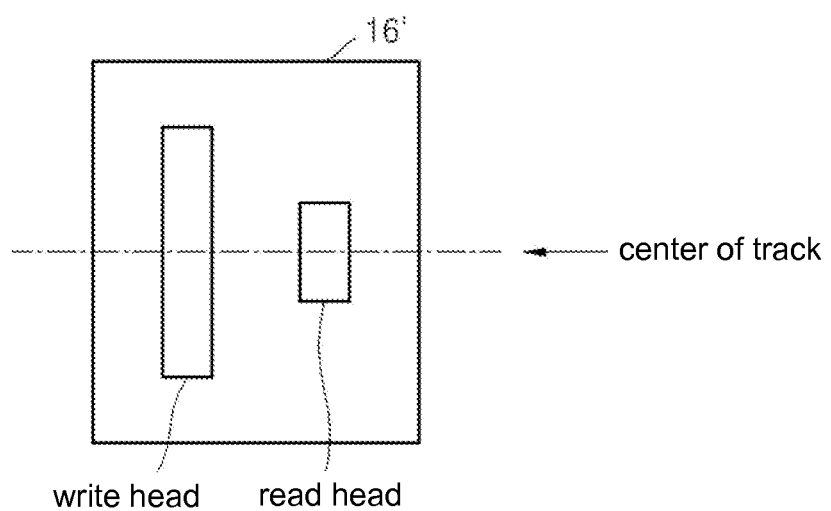

FIG. 3B is another exemplary view showing a relationship between the read head and the write head included in the head 16, in which the center of the read head and the center of the write head are identical. However, although the center of the read head and the center of the write head are identical, a skew, an MR skew, a skew value, and a physical offset may be generated between the read head and the write head according to the position of the actuator arm 14 (according to the position of the head 16).

The presence of a skew (mutually deviated) between the read head and the write head means that the position of the read head is required to be corrected by the skew value in reading data written to the write head by the read head. Namely, after the write head records certain data to a certain track, when the data written in the track is desired to be read by the read head, the read head should move by the foregoing skew value and, in this case, if the skew value is not accurate, a read error or read missing may occur. In an embodiment, turning of a skew between the read head and the write head may be defined as a function of detecting an optimum off track value (or an optimum skew value) between the read head and the write head.

The head 16 may be integrated to the slider 20. The slider may be configured to have a structure of generating air bearing between the head 16 and a surface of the disk 12. The slider 20 is coupled to a head gimbal assembly 22. The head gimbal assembly is attached to the actuator arm 24 having a voice coil 26. The voice coil 26 is positioned to be adjacent to the magnetic assembly 28 to specify a voice coil motor (VCM) 30. A current supplied to the voice coil 26 generates torque rotating the actuator arm 24 with respect to the bearing assembly 32. The rotation of the actuator arm 24 moves the head 16 across the surface of the disk 12. Data is generally written to a track 34 configured as a circle on the disk 12.

The disk 12 may be divided into a maintenance cylinder region not available for a user access and a user data region available for a user access. The maintenance cylinder region may be mentioned as a system area. Various types of information required for controlling a disk drive are stored in the maintenance cylinder region. The maintenance cylinder region may be set, for example, in an outer diameter region or an inner diameter region.

Information items required for performing the method of tuning a skew between a read head and a write head according to an embodiment of the present disclosure may be stored in the maintenance cylinder region. The information items required for performing the method of tuning a skew between a read head and a write head may include the foregoing TPI information of each zone and a center value of a track according to TPI.

The head 16 moves across the surface of the disk 12 in order to read data from a different track or write data to a different track. A plurality of code objects may be stored in the disk 12 in order to implement various functions by using a disk drive. For example, a code object for performing an MPE player function, a code object for performing a navigation function, a code object for performing various video games, and the like, may be stored in the disk 12.

With reference to FIG. 1, the storage medium interface unit 125 is an element for processing an interface between the processor 121 and the storage medium 124 in order for the processor 121 to access the storage medium 124 to write data or read data. When the storage device 120 is a disk drive, the storage medium interface unit 125 may include a servo circuit for controlling the head disk assembly 200 and a read/write channel circuit for performing signal processing for data reading and/or data writing.

According to an embodiment of the present disclosure, the storage medium interface unit 125 may be controlled by the processor 121 to transmit data read from the storage medium 124 through the head 16 and write data received through the host interface unit 127 or particular data to the storage medium 124 through the head 16. The particular data may include a data having a certain pattern written to data fields of at least one target track of the storage medium 124 and at least two tracks adjacent to the target track. The data having a certain pattern may be a certain test data, an E burst signal, or a calibration burst E. The E burst signal may be mentioned as a test signal or a test data that may be used to adjust the center of a track.

The E burst signal may be stored in the maintenance cylinder (MC) region of the storage medium 124 or the ROM, and temporarily loaded to the processor 121 or loaded to the RAM 122 so as to be used.

The host interface unit 127 in FIG. 1 may perform a data transmission and/or reception between the host device 110 and the storage device 120. The host interface unit 127 may be configured based on the communication link 130.

The bus 126 may deliver information between the elements of the storage device 120.

Figure 4:
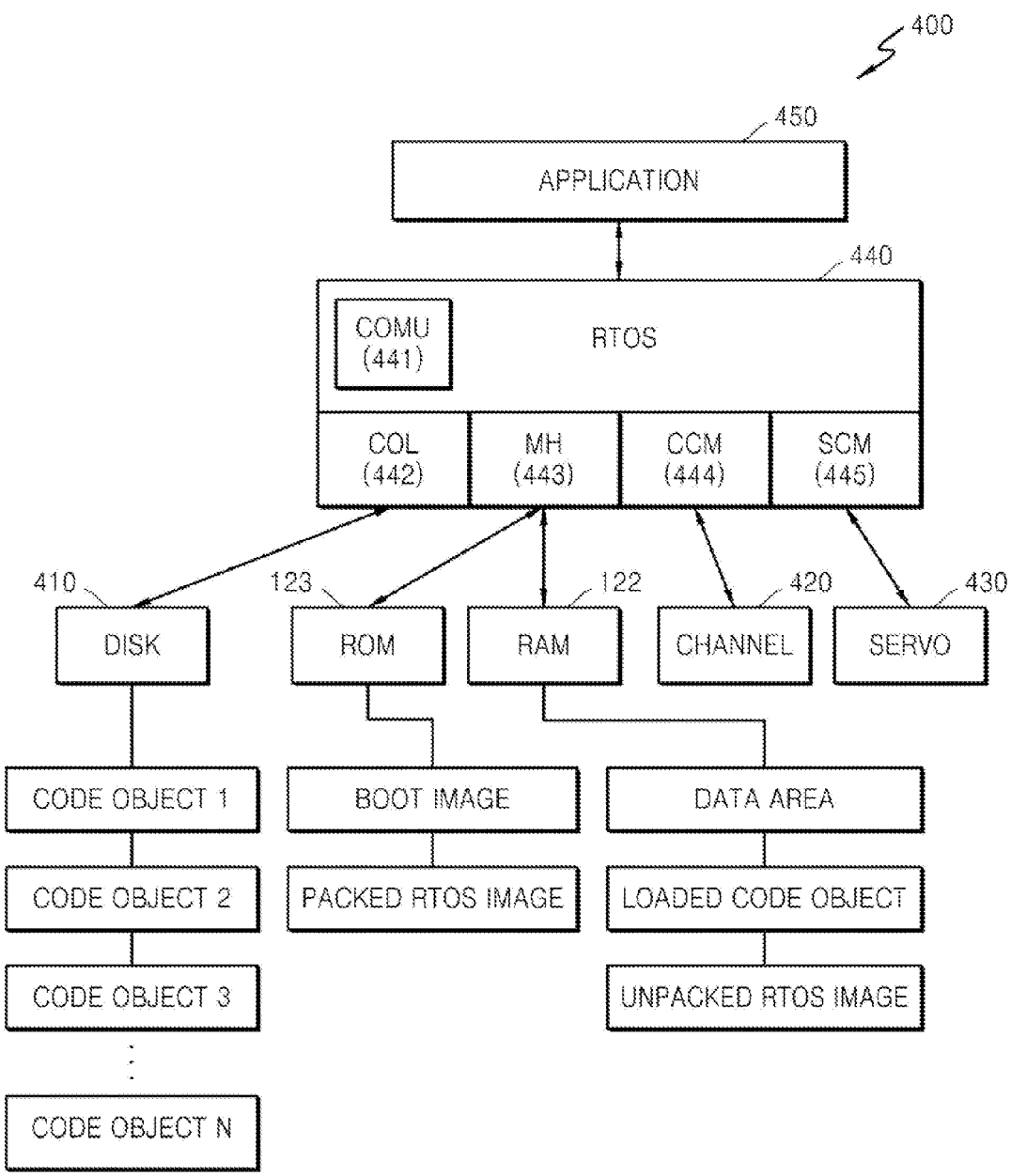
FIG. 4 is a view showing a software operating system when the storage device of FIG. 1 is a disk drive.

When the storage device 12 is a disk drive, a software operating system of the storage device 120 may be defined as illustrated in FIG. 4. FIG. 4 is a view showing a software operating system when the storage device 120 of FIG. 1 is a disk drive.

With reference to FIG. 4, a plurality of code objects 1~N are stored in the disk 410 corresponding to the storage medium 124. The code objects written in the disk 410 may include code objects required for an operation of the disk drive and code objects related to various functions using a disk drive.

In particular, in order to execute an embodiment of the present disclosure, code objects for executing the method of tuning a skew between a read head and a write head of FIG. 8 or FIG. 10 may be written in the disk 410. The code objects for executing the method of tuning a skew between a read head and a write head according to the flow charts of FIG. 8 or FIG. 10 may be stored in the ROM 123 instead of the disk 410. Code objects performing various functions such as an MP3 player function, a navigation function, a video game function, and the like, may also be stored in the disk 410.

A boot image and a packed RTOS image are stored in the ROM 123 of FIG. 1. An unpacked RTOS image by reading the bottom image from the ROM 12 during a booting process is loaded to the RAM 122. Code objects required for performing a host interface stored in the disk 410 are loaded to the RAM 122. A data area for storing data is allocated in the RAM 22.

Circuits required for performing signal processing for data reading and/or writing are installed in a channel circuit 420. Circuits required for controlling a disk assembly 200 for performing data read operation or data write operation are installed in a servo circuit 430.

An RTOS (Real Time Operating System) 440 is a real time operating system program, which is a multi-program operating system using the disk 410. Real time multi-processing is performed in a foreground having high priority and collective processing is performed in a background having low priority according to tasks. The RTOS 440 may load code objects from the disk 410 or unload code objects to the disk 410.

The RTOS 440 may manage a code object management unit (COMU) 441, a code object loader (COL) 442, a memory handler (MH) 443, a channel control module (CCM) 444, and servo control module (SCM) 445 and execute a task according to a requested command. The RTOS 440 manages application programs 450.

The RTOS 440 loads code objects required for controlling a disk drive during a process of booting the disk drive. Thus, when the booting process is executed, the disk 310 can be operated by using code objects loaded to the RAM 122. Also, the RTOS 440 may be operated based on an HTL (HDD Translation Layer) to be mentioned in FIGS. 6A and 6B as described hereinafter when the disk 410 is a shingled write disk.

The COMU 441 stores position information in which code objects are written, and performs processing of mediating the bus 126. Also, information regarding priority of tasks are also stored in the COMU 441. Also, the COMU 441 manages task control block (TCB) information and stack information required for performing a task with respect to code objects.

The COL 442 performs processing of loading the code objects stored in the disk 410 to the RAM 122 or unloading the code objects stored in the RAM 122 to the disk 140 by using the COMU 441. Accordingly, the COL 442 may load code objects for executing the method of tuning a skew between a read head and a write head according to the flow charts of FIGS. 8 and 10 stored in the disk 410 to the RAM 122.

The RTOS 440 may execute the method of tuning a skew between a read head and a write head of FIGS. 8 and 10 as described hereinafter by using the code objects loaded to the RAM 122.

The MH 443 may perform processing of writing data to the ROM 123 and the RAM 122 or reading data from the ROM 123 and the RAM 122. The CCM 444 performs channel controlling required for signal processing for data reading and writing. The CSM 445 may perform servo controlling including the head disk assembly 200 to perform the method of tuning a skew between a read head and a write head according to the flow charts of FIGS. 8 and 10.

Figure 5:
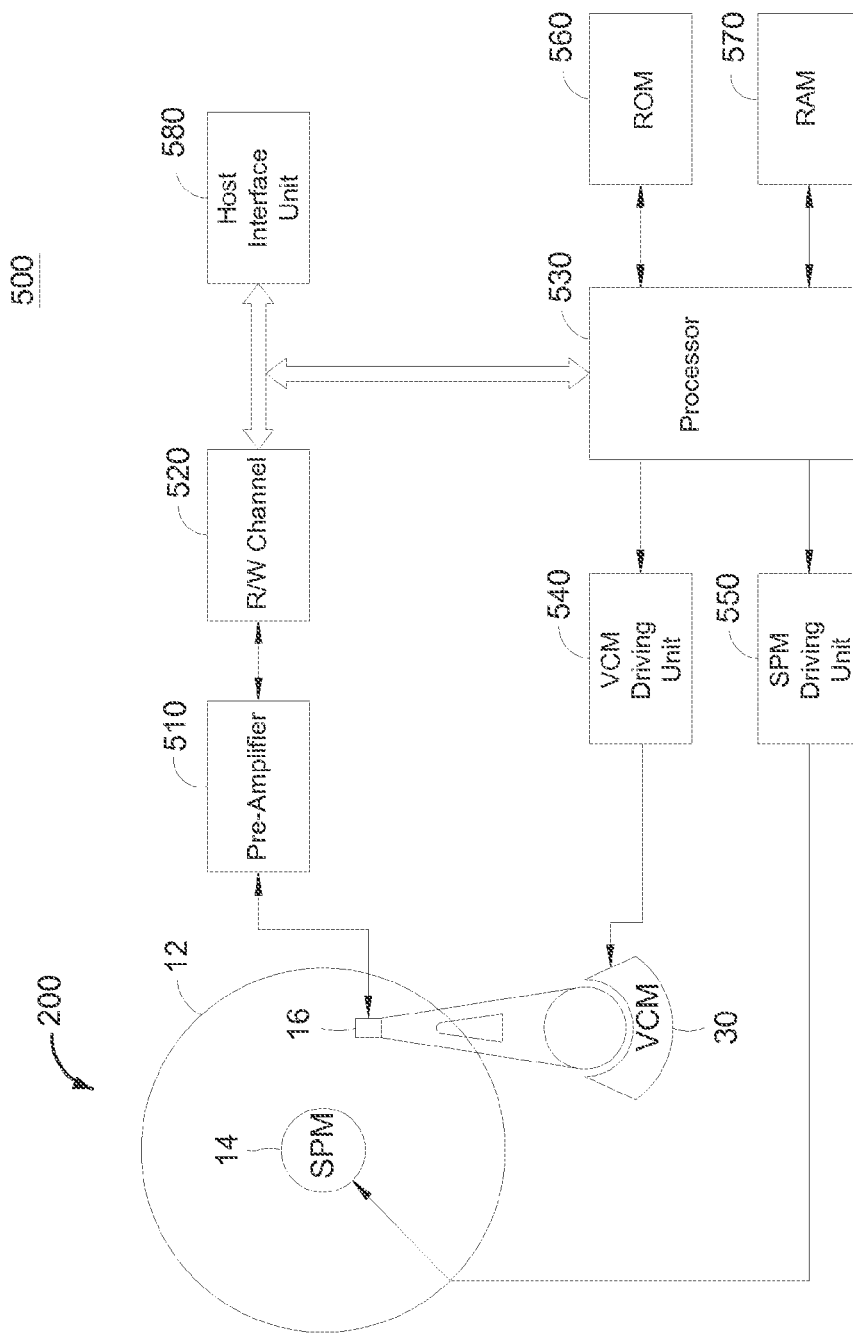
FIG. 5 is an electrical functional block diagram of the storage device when the storage device of FIG. 1 is a disk drive.

FIG. 5 is an electrical functional block diagram of the storage device 120 when the storage device 120 of FIG. 1 is a disk drive.

With reference to FIG. 5, a disk drive, an example of the storage device 120, includes the head disk assembly 200, a preamplifier 510, a read/write (R/W) channel 520, a processor 530, a voice coil motor (VCM) driving unit 540, a spindle motor (SPM) driving unit 550, a ROM 560, a RAM 570, and a host interface unit 580. The configuration of the disk drive 500 is not limited to that illustrated in FIG. 5.

The processor 530 may be configured as a digital signal processor (DSP), a microprocessor, a microcontroller, or the like, but the present disclosure is not limited thereto. The processor 530 controls the read/write channel 520 in order to read data from the disk 12 or write data to the disk 12 according to a command received from the host device 110 through the host interface unit 580.

The processor 530 is coupled to the VCM driving unit 540 for supplying a driving current for driving the VCM 30. The processor 530 may supply a control signal to the VCM driving unit 540 in order to control a movement of the head 16.

The processor 530 is coupled to the SPM driving unit 550 for supplying a driving current for driving the spindle motor (SPM) 14. When power is supplied, the processor 530 may supply a control signal to the SPM driving unit 550 in order to rotate the spindle motor 14 at a target speed.

The processor 530 is coupled to the ROM 560 and the RAM 570. The ROM 560 stores firmware and control data for controlling the disk drive 500. The program codes and information for executing the method of tuning a skew between a read head and a write head according to the flow charts of FIGS. 8 and 10 may be stored in the ROM 560.

In an initialization mode, the program codes stored in the maintenance cylinder region of the disk 12 or the ROM 560 are loaded to the RAM 570 under the control of the processor 530 so as to be used by the processor 530. The RAM 570 may be implemented as a DRAM (Dynamic Random Access Memory) or an SRAM (Static Random Access Memory).

The processor 530 may control the disk drive 500 to execute the method of tuning a skew between a read head and a write head according to the flow charts of FIGS. 8 and 10 by using the program codes and information items stored in the maintenance cylinder region of the disk 12 or the ROM 560.

In particular, the processor 530 according to an embodiment of the present disclosure may set a center value of a track according to a TPI value of each zone, DC-erase every data sector of a target track of the disk 12 and at least two tracks adjacent to the target track based on the set center value of the track, write an E burst signal, and a plurality of off track values within an off track range according to the set center value of the track, and control the R/W channel 520 and the VCM driving unit 540 to read the E burst signal. The TPI value of each zone may be the same or may be different. The fact that the TPI value of each zone is different means that the number of tracks per inch is different by zone. As for the TPI value, one value may be set per disk 12 rather than being allocated to each zone as described above.

A data read operation and a data write operation of the disk drive 500 will be described.

During a data read operation, the disk drive 500 amplifies an electrical signal detected by the head 16 from the disk 12 by the preamplifier 510. The read/write channel 520 converts a signal output from the preamplifier 510 into a digital signal and decodes the same to detect data. The detected data after being decoded is subjected to an error correction using an error correction code such as Reed-Solomon code, and then, is converted into stream data. The stream data may be transmitted to the host device 110 through the host interface unit 580.

When the electrical signal detected by the head 16 is an E burst signal according to an embodiment of the present disclosure, the processor 530 may compare the E burst signal before being stored and recorded in the RAM 570 with the E burst signal detected after being decoded to detect an error occurrence number. The error occurrence number may be detected in a manner of counting an error occurrence number in a CSM (Channel Statistic Measurement) test. The error occurrence number may be detected in units of an off track value. For example, when the E burst signal is read while changing an off track value by 1% each time within an off track range, the processor 530 may detect an error occurrence number corresponding to the off track value which has been changed by 1% each time, respectively.

The processor 530 detects an off track value having a minimum error occurrence number among error occurrence numbers corresponding to respective off track values, as an optimum off track value of a target track, configure a reference table with the detected optimum off track value, and store the configured reference table in the RAM 570 in order to use it during a read operation according to a read command or a write operation according to a write command from the host device 110. When power of the disk drive 500 is turned off, the reference table with respect to the optimum off track value stored in the RAM 570 may be stored in the ROM 560 or in the maintenance cylinder region of the disk 12.

During a data write operation, the disk drive 500 receives data from the host device 110 through the host interface unit 580. The processor 530 adds an error correction symbol based on Reed-Solomon code to the received data. The data to which the error correction symbol has been added by the read/write channel 520 is coded so as to be appropriate for a write channel. Data coded by the preamplifier 510 is written to the disk 12 through the head 16 by an amplified write current.

Also, when a process of optimizing various parameters related to hardware of the disk drive 500 is performed, in order to perform tuning of a skew between a read head and a write head according to an embodiment of the present disclosure, the processor 530 writes a data having a certain pattern such as an E burst signal to at least one target track and at least two tracks adjacent to the target track through the preamplifier 510 and the head 16 in the disk 12. Information regarding the target track and the at least two tracks adjacent to the target track may be previously loaded to the RAM 570 and used.

The RAM 570 and the ROM 560 in FIG. 5 may be mentioned as a single information storage unit.

Figure 6A:
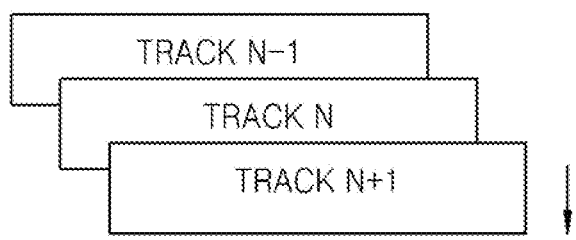
FIG. 6A and 6B are views showing a restrictive condition when data is written based on a shingled write operation.
Figure 6B:
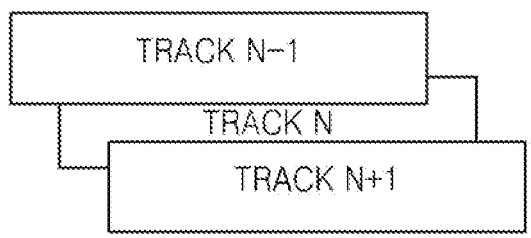

When data is written to the disk 12 according to a shingled write scheme in order to reduce a track pitch, data should be written only in one direction. In the case of the disk 12 illustrated in FIG. 5, data should be written only in an inner circumferential direction or an outer circumferential direction. This is because of the restrictive condition as illustrated in FIGS. 6A and 6B. FIG. 6A and 6B are views showing a restrictive condition when data is written based on a shingled write operation.

With reference to FIG. 6A, when a shingled write operation is performed in an arrow direction as illustrated in FIG. 6A, flux is generated only in the arrow direction. Thus, when data is written based on the shingled write operation, a restrictive condition that after data is written to a track TRACK N, data cannot be written to a track TRACK N−1 should be met. If data is written to a track TRACK N−1 in a direction opposite to the direction in which shingled writing proceeds after data is written to the track TRACK N as shown in FIG. 6B, data written to the track TRACK N is erased by adjacent track interference (ATI).

Thus, when data is written based on the shingled write operation, a technique of dynamically allocating physical addresses of the disk with respect to logical addresses received from the host device 110 such that data writing is performed only in any one of the inner circumferential direction and outer circumferential direction of the disk all the time is required.

HTL is a technique proposed to satisfy the restrictive condition when data is written based on the foregoing shingled write operation. In HTL, logical block addresses transmitted from the host device 110 is converted into a virtual block address, and the virtual block addresses are converted into physical block addresses to access the disk 12. The physical block address may be, for example, a CHS (Cylinder Head Sector).

When the disk drive 500 performs an operation of writing data to the disk 12 based on the shingled write operation, a virtual block address may be allocated such that the E burst signal according to an embodiment of the present disclosure may also be written based on the shingled write operation. Namely, when a target track is Nth track, a virtual block address may be allocated such that, in order to write an E burst signal to (N−1)th track and (N+1)th track, the E burst signal is written starting from (N−1)th track, written to the Nth track, and then, written to the (N+1)th track. The allocated virtual block addresses may be converted into physical addresses to access the disk 12.

Figure 7:
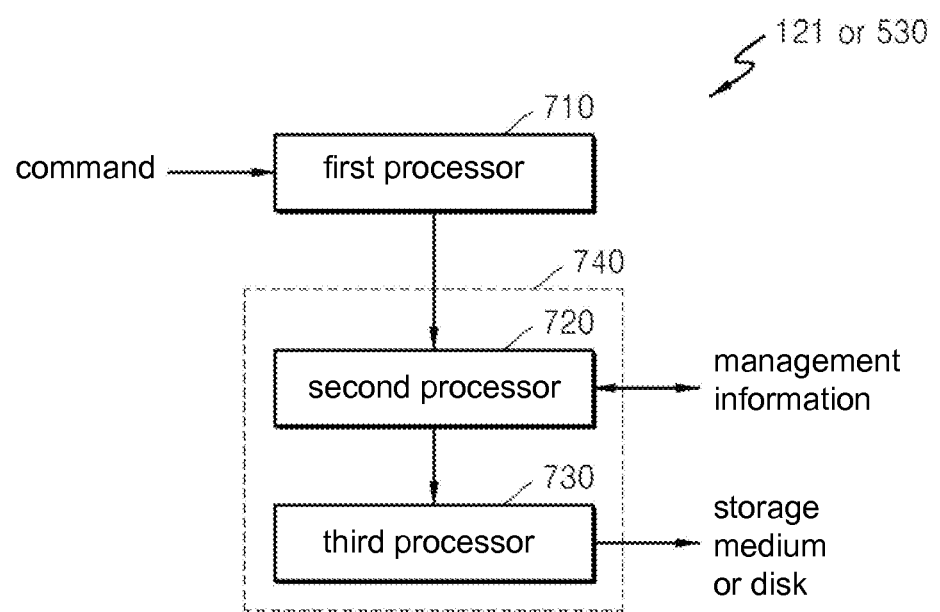
FIG. 7 is a view showing an example of a configuration of a processor in a storage device according to another embodiment.

FIG. 7 is a view showing an example of a configuration of the processor 530 in the storage device according to an embodiment of the present disclosure, when data is read and written based on HTL. The processor 121 included in the storage device 120 of FIG. 1 may also be configured as shown in FIG. 7 when the storage device 120 is operated based on HTL.

With reference to FIG. 7, the processor 121 or 530 may include a first processor 710, a second processor 720, and a third processor 730. Here, the second processor 720 and the third processor 730 may be designed to be integrated into a single processor 740. Of course, although not shown, the first processor 710 and the second processor 720 may be designed to be integrated into a single processor.

The first processor 710 may perform an operation of receiving a command from the host device 110 and extracting a logical block address from the received command.

The second processor 720 may perform an operation of converting the logical block address extracted by the first processor 710 into a virtual block address. According to an embodiment of the present disclosure, the second processor 720 may execute the method of tuning a skew between a read head and a write head according to the flow chart of FIG. 8 or FIG. 10 as described hereinafter. In order to execute the method of tuning a skew between a read head and a write head according to the flow chart of FIG. 8 or FIG. 10, the second processor 720 may read management information regarding the disk 12 stored in the RAM 570 and use it. The management information may include a TPI value of each zone, a corresponding center value of a track, and identification information of a target track. The management information may include address mapping table information. Also, the management information may include a reference table (or a look-up table) configured according to an optimum off track value of a target track to be generated according to an embodiment of the present disclosure. Accordingly, when a read or write command is received from the host device 110, the second processor 720 may perform tracking by using the optimum off track value included in the foregoing reference table.

The third processor 730 may control the R/W channel 520, the preamplifier 510, the voice coil motor (VCM) driving unit 540, and the spindle motor (SPM) driving unit 550 in order to convert the virtual block address transmitted from the second processor 720 into a physical address, e.g., a CHS, and read data from the disk 12 or write data to the disk 12 based on the physical address.

FIG. 8 is a flow chart illustrating a method of tuning a skew between a read head and a write head according to an embodiment of the present disclosure. Hereinafter, a description will be based on the processor 530 of FIG. 5. However, it should be interpreted such that the processor 121 of FIG. 1 is also applied in the same manner.

When the disk drive 500 performs a skew tuning process between the read head and the write head among processes for optimizing various parameters related to hardware, the processor 530 sets a center value of a track according to a TPI value of each zone with respect to the disk 12 (S801). The process for optimizing various parameters related to hardware as mentioned above may be performed at an initial driving of the disk drive 500 regardless of a command from the host device 110, or may be performed according to a request command from the host device 110. Also, the processor 530 may set a center value according to a TPI value of the disk 12, rather than the TPI value of each zone of the disk 12.

In order to set the center value of a track in step S801, the processor 530 reads a TPI value of a zone in which a target track is positioned. At least one track of each zone may be previously set as a target track.

FIGS. 9A through 9D are exemplary views of ideal bathtub graphs obtained when a center value of a track is changed according to a value of TPI performed in an embodiment of the present disclosure. An example of setting a track center value will be described with reference to the example illustrated in FIGS. 9A through 9D.

Figure 9A:
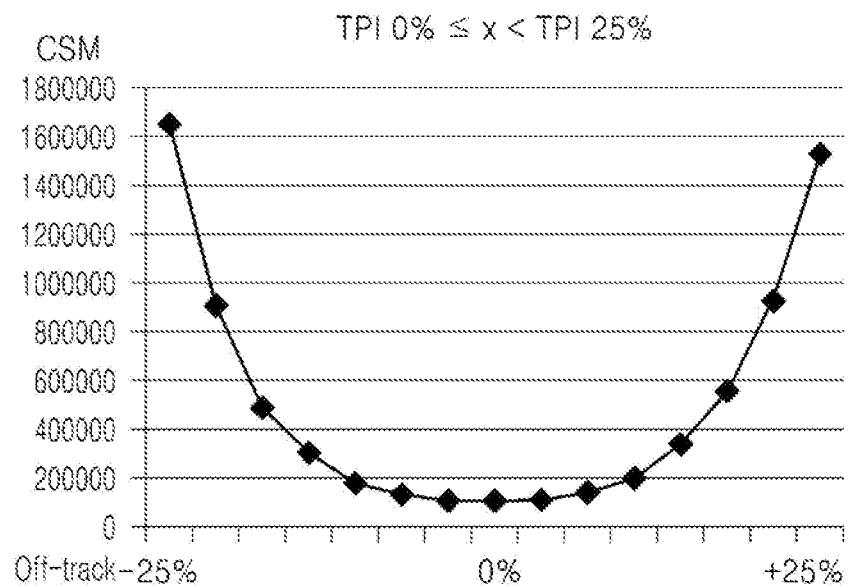
FIGS. 9A through 9D are exemplary views of ideal bathtub graphs obtained when a center value of a track is changed according to a value of TPI performed in another embodiment.

The processor 530 compares a TPI value read from the RAM 570 with a reference TPI value. According to the comparison results, as shown in FIG. 9A, when the read TPI value x corresponds to a range less than the number of tracks (TPI 25%) greater than 25% than the reference TPI value starting from the same value (TPI0%) as the reference TPI value, the processor 530 does not change the center value of the track (track center value 0%). For example, when the reference TPI value is 10 and the read TPI value x is 12, the read TPI value corresponds to the range of the TPI value illustrated in FIG. 9A.

Figure 9B:
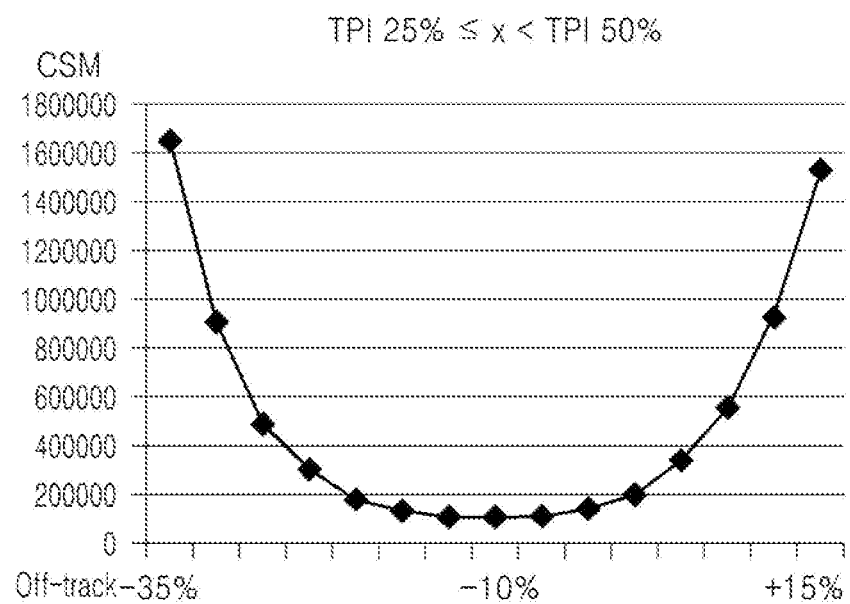

According to the comparison results, as shown in FIG. 9B, when the read TPI value x corresponds to a range less than the number of tracks (TPI 50%) greater by 50% than the reference TPI value starting from the number of tracks (TPI 25%) greater by 25% than the reference TPI value, the processor 530 sets the center value of the track such that it is changed (10% reduced) by 10% (−10%) in a negative direction from the spot in which the track center value is 0%.

Figure 9C:
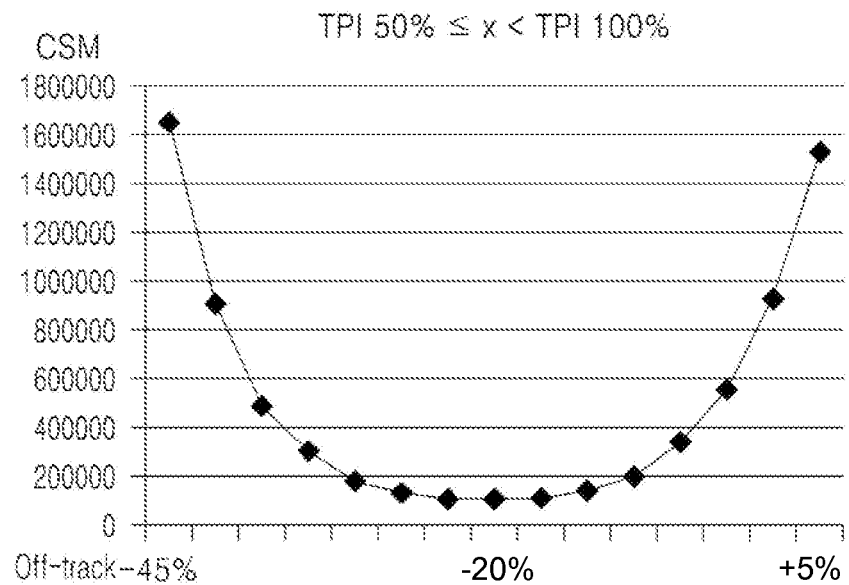

According to the comparison results, as shown in FIG. 9C, when the read TPI value x corresponds to a range less than the number of tracks (TPI 100%) greater by 100% than the reference TPI value starting from the number of tracks (TPI 50%) greater by 50% than the reference TPI value, the processor 530 sets the center value of the track such that it is changed (20% reduced) by 20% (−20%) in the negative direction from the spot in which the track center value is 0%.

Figure 9D:
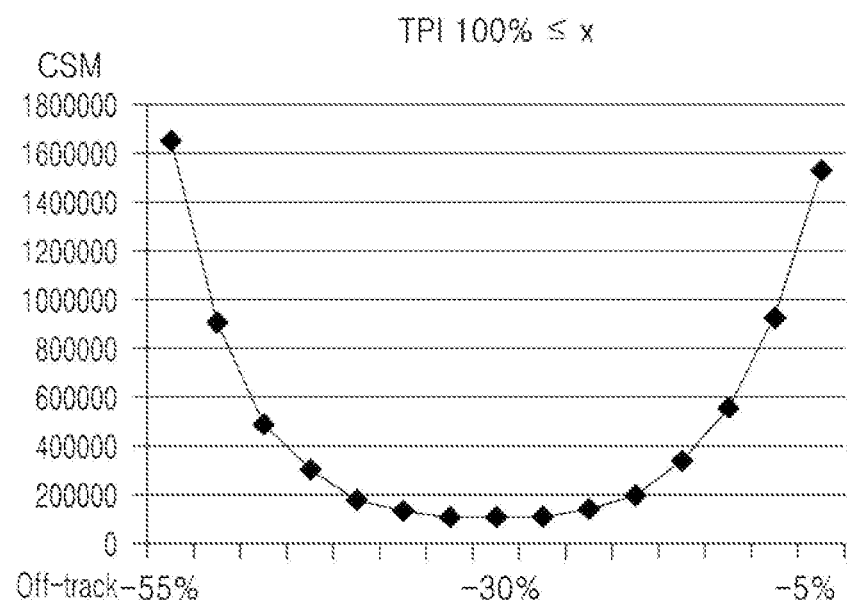

According to the comparison results, as shown in FIG. 9D, when the read TPI value x corresponds to a range equal to or greater than the number of tracks (TPI 100%) greater by 100% than the reference TPI value, the processor 530 may set the center value of the track such that it is changed (30% reduced) by 30% (−30%) in the negative direction from the stop in which the track center value is 0%.

Setting of the center value of the track according to a track density is not limited to the configuration illustrated in FIGS. 9A through 9D. Also, the track density may be stored as a value indicating what % of the reference TPI value it corresponds to in the RAM 570 beforehand so that the foregoing comparison process may not be performed.

When the track center value is set, the processor 530 writes a data having a certain pattern to at least one target track and at least two tracks adjacent to the target track of a corresponding zone while following the center value of the tracks (S802). As the data having a certain pattern, for example, an E burst signal may be used. The target track may be, for example, Nth track in the zone, and when data is written according to a shingled write scheme in the disk 12, the at least two adjacent tracks may be (N−1)th track and (N+1)th track. This is to consider the shingled write characteristics that data is written in an overlapping manner in a partial region of a previous track. Here, N is an integer of 2 or greater.

The processor 530 reads the data having a certain pattern from the target track by using a plurality of off track values within the range of the off tracks based on the center value of the track set in step S801 (S803).

As for the range of the off tracks, as shown in FIG. 9A, in case that the off track range is −25%+25% when the position of the track center is 0%, if the position of the track center is changed by −10% as shown in FIG. 9B, the off track range may be −35%+15%, and when the position of the track center is 0%, if the position of the track center is changed by −20% as shown in FIG. 9C, the off track range may be −45%+5%, and if the position of the track center is changed by −30% as shown in FIG. 9D, the off track range may be −55%–5%. However, when the TPI value is increased, the width of the track is reduced, so the off track range may be changed into a narrower range proportional to the reduction in the position of the center of the track, rather than being changed to the certain ranges as illustrated in FIGS. 9A through 9D. For example, when the position of the track center is changed by −10%, the off track range may be changed to −30%+10%, rather than to 35%+15%. The off track ranges according to the center values of the tracks are experimentally obtained and stored in the maintenance cylinder region of the disk 12 of the ROM 560 in advance and loaded to the RAM 570 so as to be used by the processor 530.

When the off track range is set as shown in FIG. 9*b*, the forgoing plurality of off track values may be changed by a certain amount (e.g., 1%) in a leftward direction (a maximum of +15%) and in a rightward direction (a maximum of −35%) based on −10%, the position of the center of the track. If data having a certain pattern is read from the target track while changing the off track value by 1%, data having a certain pattern written to the target track according to 51 off track values may be read.

When the data having a certain pattern is read from the target track, the processor 530 obtains an error occurrence number with respect to the read data having a certain pattern corresponding to each of the plurality of off track values (S804). The error occurrence number may be obtained by comparing the data having a certain pattern before being written and stored in the RAM 570 and the read data having a certain pattern by bits. For example, the error occurrence number may be detected in such a manner as counting an error occurrence number in performing CSM (Channel Statistic Measurement) testing.

When the error occurrence number per off track value is detected, the processor 530 detects an off track value having a minimum error occurrence number among the detected error occurrence numbers, as an optimum off track value of the target track (S805). When the off track value of the target track is detected, the processor 530 configures a reference table as described above, stores the same in the RAM 570, and uses the reference table in reading and writing data with respect to a corresponding zone.

FIG. 10 is a flow chart illustrating a method of tuning a skew between a read head and a write head according to another embodiment of the present disclosure. Hereinafter, a description will be based on the processor 530 of FIG. 5. However, it should be interpreted such that the processor 121 of FIG. 1 is also applied in the same manner.

FIG. 10 shows an example of adding a process of performing skew tuning between a read head and a write head according to an embodiment of the present disclosure by changing the DC erase process and the target track. Thus, step 1001 and steps 1003 to 1006 illustrated in FIG. 10 are the same as the steps 801 to 805 illustrated in FIG. 8, so a repeated description will be omitted.

In step S1002 of FIG. 10, the processor 530 performs DC erasing on data fields of a target track and at least two tracks adjacent to the target track by using a set center value of tracks. This is to read only data having a certain pattern written in case of skew tuning between a read head and a write head.

When an optimum off track value with respect to the target track is detected, the processor 530 changes the target track (S1007) and repeatedly performs the foregoing steps S1001 to S1006. When a plurality of target tracks are set, the processor 530 may change the tracks until when an optimum off track value with respect to all the set target tracks is detected. A plurality of target tracks may be set in the same zone, or a single target track may be set for each zone. When a single target track is set for each zone and the disk 12 includes M number of target tracks, and the process 530 performs the process of changing the target tracks in step S1007 until when optimum off track values with respect to the M number of target tracks are all detected.

In some embodiments, a method of tuning a skew between a read head and a write head may comprise setting a center value of a track according to a track density of a storage medium; writing data having a certain pattern to at least one target track and at least two tracks adjacent to the target track, while following the center value of the track; reading the data having a certain pattern from the target track by using a plurality of off track values in an off track range based on the center value of the track; and detecting an off track value having a minimum error occurrence number among error occurrence numbers with respect to the read data having a certain pattern corresponding to each of the plurality of off tracks, as an optimum off track value of the target track.

The method may also include wherein when the target track is Nth track, the at least two adjacent tracks include (N−1)th track and (N+1)th track, and N is an integer of 2 or greater. The method may also include performing DC-erasing before writing the data having a certain pattern in the least two tracks adjacent to the target track. The method may also include wherein, in the setting of the center value of the track, a position changed in a negative (−) direction from a reference center value of the track is set as the center value of the track according to the density of the track. The method may also include, wherein the track density is based on the number of tracks per inch. The method may also include wherein the data having a certain pattern is a burst signal.

In another embodiment, a storage device may comprise: a storage medium storing data; and a processor detecting an optimum off track value of at least one target track by setting a center value of a track according to a track density of the storage medium, wherein the processor writes data having a certain pattern to at least one target track and at least two tracks adjacent to the target track, while following a center value of the track, reads the data having a certain pattern from the target track by using a plurality of off track value in an off track range based on the center value of the track, and detects an off track value having a minimum error occurrence number among error occurrence numbers with respect to the read data having a certain pattern corresponding to each of the plurality of off tracks, as an optimum off track value of the target track.

The storage device may also comprise, wherein when the target track is Nth track, the at least two adjacent tracks include (N−1)th track and (N+1)th track, and N is an integer of 2 or greater. The storage device may also comprise, the processor performs DC-erasing before writing the data having a certain pattern in the least two tracks adjacent to the target track. The storage device may also comprise, wherein the processor sets a position changed in a negative (−) direction from a reference center value of the track, as the center value of the track according to the density of the track. The storage device may also comprise, wherein the track density is based on the number of tracks per inch. The storage device may also comprise, wherein the data having a certain pattern is a burst signal.

The program for performing the method of tuning a skew between a read head and a write head according to an embodiment of the present disclosure may be implemented as computer-readable codes in a computer-readable storage medium. The computer readable recording medium includes all types of recording devices storing data readable by computer systems. Examples of the computer readable recording medium include ROM, RAM, CD-ROM, magnetic tapes, floppy disks, hard disks, and optical data storage devices. The computer readable recording medium can also be distributed over network coupled computer systems so that the computer readable code is stored and executed in a distributed fashion.

While embodiments have been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A method comprising:
    setting a center value of at least one target track of a data storage medium having tracks recorded in a shingled manner where one track partially overlaps an adjacent track, the center value based on a track density of the data storage medium;
    writing data to an adjacent previous track to the target track, then to the at least one target track, then an adjacent subsequent track to the target track, so that the adjacent subsequent track partially overlaps the target track, and the target track partially overlaps the adjacent previous track;
    reading the data a number of times by adjusting a position of a read head based on a range of off track values, the range of off track values based on the center value of the at least one target track; and
    determining an optimum off track value of the at least one target track resulting in a minimum error occurrence number with respect to the read data corresponding to each of the range of off track values.

2. The method of claim 1, further comprising the at least one target track is Nth track, the adjacent previous is the (N−1)th track and the adjacent subsequent track is the (N+1)th track, N comprising an integer of 2 or greater.

3. The method of claim 1, further comprising:
    performing DC-erasing on the at least one target track, the at adjacent previous track, and the adjacent subsequent track before writing the data.

4. The method of claim 1, further comprising setting the center value of the at least one target track includes setting the center value in a negative (−) direction from a reference center value of the at least one target track according to the track density of the data storage medium.

5. The method of claim 1, further comprising the track density is based on a number of tracks per inch.

6. The method of claim 1 further comprising:
    the track density is for a zone of the data storage medium including the at least one target track; and
    storing the optimum off track value to a reference table, the optimum off track value corresponding to the zone including the at least one target track.

7. The method of claim 6 further comprising:
    setting the center value in a negative (−) direction from a reference center value of the at least one target track in an amount based on a difference between the track density of the zone and a reference track density; and
    reducing the range of off track values based on the difference between the track density of the zone and the reference track density.

8. An apparatus comprising:
    a processor configured to:
        set a center value of a target track of a data storage medium based on a track density for a zone of the data storage medium including the target track;
        write data to the target track while following the center value of the target track;
        read the data from the target track a number of times by adjusting a position of a read head based on a range of off track values, the range of off track values based on the center value of the at least one target track; and
        select an optimum off track value for the target track from the range of off track values, the optimum off track value resulting in a minimum error occurrence number with respect to the read data corresponding to each of the range of off track values; and
        store the optimum off track value to a reference table, the optimum off track value corresponding to the zone including the target track.

9. The apparatus of claim 8 further comprising:
    the data storage medium having tracks recorded in a shingled manner where one track partially overlaps an adjacent track.

10. The apparatus of claim 9, comprising the processor further configured to:
    write the data to the target track and at least two adjacent tracks, so that the target track and the at least two adjacent tracks are written in a shingled manner, and wherein when the target track is an Nth track, the at least two adjacent tracks include an (N−1)th track and an (N+1)th track.

11. The apparatus of claim 10, comprising the processor further configured to perform DC-erasing before writing the data to the least two tracks adjacent to the target track.

12. The apparatus of claim 8, wherein the processor sets the center value by adjusting a reference center value in a negative (−) direction in an amount based on the track density.

13. The apparatus of claim 8, wherein the data comprises a burst signal.

14. The apparatus of claim 8, further comprising:
    the processor configured to:
        set the center value in a negative (−) direction from a reference center value of the target track in an amount based on a difference between the track density of the zone and a reference track density; and
        reduce the range of off track values proportional to the difference between the track density of the zone and the reference track density.

15. An apparatus comprising:
    a processor configured to:
        set a center value of a target track based on a track density of a data storage medium having tracks recorded in a shingled manner where one track partially overlaps an adjacent track;
        write data to a previous track adjacent to the target track, write data to the target track, and write data to a subsequent track adjacent to the target track, so that the subsequent track partially overlaps the target track, and the target track partially overlaps the previous track;
        read the data a number of times by adjusting a position of a read head based on a range of off track values, the range of off track values based on the center value of the target track; and determine an optimum off track value of the target track resulting in a minimum error occurrence number with respect to the read data corresponding to each of the range of off track values.

16. The apparatus of claim 15, further comprising:
the processor configured to:
set the center value in a negative (−) direction from a reference center value of the at least one target track according to the track density.

17. The apparatus of claim 15 further comprising:
the track density is for a zone of the data storage medium including the target track.

18. The apparatus of claim 17 comprising the processor further configured to:
store the optimum off track value to a reference table, the optimum off track value corresponding to the zone including the target track.

19. The apparatus of claim 18, further comprising:
the processor configured to:
set the center value in a negative (−) direction from a reference center value of the target track in an amount based on a difference between the track density of the zone and a reference track density.

20. The apparatus of claim 19 further comprising:
the range of off track values is reduced based on the difference between the track density of the zone and the reference track density.

* * * * *